United States Patent
Fairchild et al.

(10) Patent No.: US 11,956,224 B2
(45) Date of Patent: Apr. 9, 2024

(54) USING MACHINE-LEARNING MODELS TO AUTHENTICATE USERS AND PROTECT ENTERPRISE-MANAGED INFORMATION AND RESOURCES

(71) Applicant: Bank of America Corporation, Charlotte, NC (US)

(72) Inventors: Albena N. Fairchild, Spruce Pine, NC (US); Elena Kvochko, New York, NY (US)

(73) Assignee: Bank of America Corporation, Charlotte, NC (US)

( * ) Notice: Subject to any disclaimer, the term of this patent is extended or adjusted under 35 U.S.C. 154(b) by 311 days.

(21) Appl. No.: 16/899,087

(22) Filed: Jun. 11, 2020

(65) Prior Publication Data

US 2021/0392124 A1    Dec. 16, 2021

(51) Int. Cl.
*H04L 9/40* (2022.01)
*G06N 20/00* (2019.01)

(52) U.S. Cl.
CPC .............. *H04L 63/08* (2013.01); *G06N 20/00* (2019.01); *H04L 63/1416* (2013.01)

(58) Field of Classification Search
CPC . H04L 63/08; H04L 63/1416; H04L 63/1427; H04L 63/0227; G06N 20/00
See application file for complete search history.

(56) References Cited

U.S. PATENT DOCUMENTS

| | | | |
|---|---|---|---|
| 7,672,909 B2 | 3/2010 | Meijer et al. | |
| 7,937,349 B2 | 5/2011 | Pucher | |
| 8,359,287 B2 | 1/2013 | Pucher | |
| 8,516,584 B2 | 8/2013 | Moskovitch et al. | |
| 11,301,550 B2 * | 4/2022 | Grajek | G06N 20/00 |

(Continued)

OTHER PUBLICATIONS

P. A. Legg, O. Buckley, M. Goldsmith and S. Creese, "Automated Insider Threat Detection System Using User and Role-Based Profile Assessment," in IEEE Systems Journal, vol. 11, No. 2, pp. 503-512, Jun. 2017, doi: 10.1109/JSYST.2015.2438442. (Year: 2017).*

(Continued)

*Primary Examiner* — Robert B Leung
(74) *Attorney, Agent, or Firm* — Banner & Witcoff, Ltd.

(57) ABSTRACT

Aspects of the disclosure relate to using machine-learning models to authenticate users and protect enterprise-managed information and resources. In some embodiments, a computing platform may receive user interaction data from enterprise computing infrastructure and may train one or more authentication models based on this data. Subsequently, the computing platform may receive, from a first application server, a request to authenticate a first user to a first user account in a first usage session hosted by the first application server. In response to receiving this request, the computing platform may identify whether session-specific interaction data for the first usage session is valid based on the one or more authentication models. If the interaction data is identified as being valid, the computing platform may generate and send one or more commands directing the first application server to allow the first user to access the first user account in the first usage session.

16 Claims, 8 Drawing Sheets

(56) References Cited

U.S. PATENT DOCUMENTS

| | | | |
|---|---|---|---|
| 2016/0110528 A1* | 4/2016 | Gupta | G06F 21/577 726/19 |
| 2016/0112397 A1* | 4/2016 | Mankovskii | H04L 63/105 726/6 |
| 2016/0203316 A1* | 7/2016 | Mace | G06F 21/316 726/23 |
| 2017/0098172 A1 | 4/2017 | Ellenbogen et al. | |
| 2017/0214701 A1 | 7/2017 | Hasan | |
| 2018/0152561 A1* | 5/2018 | Strong | H04M 3/527 |
| 2018/0288063 A1* | 10/2018 | Koottayi | H04L 63/1416 |
| 2018/0322417 A1* | 11/2018 | Bendre | G06N 20/00 |
| 2019/0392309 A1 | 12/2019 | Bhatnagar et al. | |
| 2020/0005193 A1* | 1/2020 | Nie | G06F 11/0709 |
| 2020/0045049 A1* | 2/2020 | Apostolopoulos | H04L 63/102 |
| 2020/0074275 A1* | 3/2020 | Xia | G06N 3/045 |
| 2020/0176890 A1 | 6/2020 | Rappaport et al. | |
| 2020/0177204 A1 | 6/2020 | Abotabl et al. | |
| 2020/0177234 A1 | 6/2020 | Barzegar et al. | |
| 2020/0177237 A1 | 6/2020 | Barzegar et al. | |
| 2020/0177238 A1 | 6/2020 | Barzegar et al. | |
| 2020/0177239 A1 | 6/2020 | Henry et al. | |
| 2020/0177386 A1 | 6/2020 | Mahmood et al. | |
| 2020/0177467 A1 | 6/2020 | Ramachandran et al. | |
| 2020/0177469 A1 | 6/2020 | Kercheville et al. | |
| 2020/0177503 A1 | 6/2020 | Hooda et al. | |
| 2020/0177590 A1 | 6/2020 | Levy et al. | |
| 2020/0177598 A1 | 6/2020 | Storr | |
| 2020/0177612 A1 | 6/2020 | Kras et al. | |
| 2020/0177623 A1 | 6/2020 | Call et al. | |
| 2020/0177637 A1 | 6/2020 | Narayanaswamy et al. | |
| 2020/0177652 A1 | 6/2020 | Halepovic et al. | |
| 2020/0177671 A1 | 6/2020 | Tofighbakhsh et al. | |
| 2020/0177683 A1 | 6/2020 | Zhao et al. | |
| 2020/0177689 A1 | 6/2020 | Sellers et al. | |
| 2020/0177721 A1 | 6/2020 | Gerace et al. | |
| 2020/0178073 A1 | 6/2020 | Goluguri | |
| 2020/0178077 A1 | 6/2020 | Dutt et al. | |
| 2020/0178087 A1 | 6/2020 | Henry et al. | |
| 2020/0178097 A1 | 6/2020 | Lee et al. | |
| 2020/0178203 A1 | 6/2020 | Lee et al. | |
| 2020/0280573 A1* | 9/2020 | Johnson | G06N 3/0454 |
| 2020/0364607 A1* | 11/2020 | BahenaTapia | G06N 7/01 |

OTHER PUBLICATIONS

G. A. Susto, et al. "A Fraud Detection Decision Support System via Human On-Line Behavior Characterization and Machine Learning," 2018 First International Conference on Artificial Intelligence for Industries (AI4I), Laguna Hills, CA, USA, 2018, pp. 9-14, doi: 10.1109/AI4I.2018.8665694. (Year: 2018).*

* cited by examiner

USING MACHINE-LEARNING MODELS TO AUTHENTICATE USERS AND PROTECT ENTERPRISE-MANAGED INFORMATION AND RESOURCES

BACKGROUND

Aspects of the disclosure relate to deploying digital data processing systems, ensuring information security, and preventing unauthorized access to resources at enterprise locations. In particular, one or more aspects of the disclosure relate to using machine-learning models to authenticate users and protect enterprise-managed information and resources.

Enterprise organizations may utilize various computing infrastructure to maintain confidential information and/or other sensitive data that is created and/or used for various purposes. Ensuring that this data is secure and only accessible to appropriate users for appropriate purposes may be critically important to protecting the integrity and confidentiality of the underlying information and associated resources. In many instances, it may be difficult to ensure the security and integrity of enterprise-managed information and resources, particularly when also attempting to optimize the resource utilization, bandwidth utilization, and efficient operations of the enterprise computing infrastructure.

SUMMARY

Aspects of the disclosure provide effective, efficient, scalable, and convenient technical solutions that address and overcome the technical problems associated with ensuring information security and preventing unauthorized access by using machine-learning models to authenticate users and protect enterprise-managed information and resources. As illustrated in greater detail below, systems and methods implementing one or more aspects of the disclosure may utilize unused data (which may, e.g., include unused customer data) to train an artificial intelligence system to provide enhanced authentication functions.

In accordance with one or more embodiments, a computing platform having at least one processor, a communication interface, and memory may receive, via the communication interface, from enterprise computing infrastructure, user interaction data. Subsequently, the computing platform may train, using a machine learning engine, one or more authentication models based on the user interaction data. Then, the computing platform may receive, from a first application server associated with the enterprise computing infrastructure, a request to authenticate a first user to a first user account in a first usage session hosted by the first application server. In response to receiving the request to authenticate the first user to the first user account, the computing platform may identify whether session-specific interaction data for the first usage session is valid based on the one or more authentication models. Based on identifying that the session-specific interaction data for the first usage session is valid based on the one or more authentication models, the computing platform may generate one or more commands directing the first application server to allow the first user to access the first user account in the first usage session hosted by the first application server. In addition, the computing platform may send, to the first application server, the one or more commands directing the first application server to allow the first user to access the first user account in the first usage session hosted by the first application server, where sending the one or more commands directing the first application server to allow the first user to access the first user account in the first usage session hosted by the first application server causes the first application server to allow the first user to access the first user account in the first usage session hosted by the first application server.

In some embodiments, receiving the user interaction data from the enterprise computing infrastructure may include receiving unused customer data. In some embodiments, training the one or more authentication models based on the user interaction data may include training at least one population level model based on the user interaction data. In some embodiments, training the one or more authentication models based on the user interaction data may include training at least one user-specific model for the first user.

In some embodiments, training the at least one user-specific model for the first user may include training a first user-specific model comprising one or more of: a first parameter indicative of how often the first user accesses one or more specific enterprise systems; a second parameter indicative of how the first user interacts with the one or more specific enterprise systems; a third parameter indicative of how the first user authenticates with the one or more specific enterprise systems; a fourth parameter indicative of how much time the first user takes to make one or more selections; a fifth parameter indicative of one or more items actioned by the first user and one or more items not actioned by the first user; or a sixth parameter indicative of how the first user responds to options presented by predictive analytics.

In some embodiments, training the at least one user-specific model for the first user may include training a second user-specific model based on interaction data associated with at least two different user interaction channels. In some embodiments, training the at least one user-specific model for the first user may include training a third user-specific model based on non-interaction data.

In some embodiments, identifying whether the session-specific interaction data for the first usage session is valid based on the one or more authentication models may include identifying whether the session-specific interaction data for the first usage session is valid based on the at least one user-specific model for the first user.

In some embodiments, based on identifying that the session-specific interaction data for the first usage session is not valid based on the one or more authentication models, the computing platform may flag the first usage session as a suspicious interaction. In addition, the computing platform may generate one or more commands directing the first application server to deny access to the first user account in the first usage session hosted by the first application server. Then, the computing platform may send, to the first application server, the one or more commands directing the first application server to deny access to the first user account in the first usage session hosted by the first application server, where sending the one or more commands directing the first application server to deny access to the first user account in the first usage session hosted by the first application server causes the first application server to deny access to the first user account in the first usage session hosted by the first application server.

In some embodiments, after identifying whether the session-specific interaction data for the first usage session is valid based on the one or more authentication models, the computing platform may execute one or more continuous learning functions to update the one or more authentication models.

In some embodiments, the computing platform may receive, via the communication interface, from the enterprise computing infrastructure, updated user interaction data. Subsequently, the computing platform may re-train, using the machine learning engine, the one or more authentication models based on the updated user interaction data.

In some embodiments, after re-training the one or more authentication models based on the updated user interaction data, the computing platform may discard the updated user interaction data.

In some embodiments, after identifying whether the session-specific interaction data for the first usage session is valid based on the one or more authentication models, the computing platform may receive, via the communication interface, from an enterprise user computing device, one or more dynamic adjustment commands. In response to receiving the one or more dynamic adjustment commands from the enterprise user computing device, the computing platform may adjust one or more parameters of the one or more authentication models based on the one or more dynamic adjustment commands received from the enterprise user computing device.

In some embodiments, the computing platform may receive, from a second application server associated with the enterprise computing infrastructure, a request to authenticate a second user to a second user account in a second usage session hosted by the second application server. In response to receiving the request to authenticate the second user to the second user account, the computing platform may identify whether session-specific interaction data for the second usage session is valid based on the one or more authentication models. Based on identifying that the session-specific interaction data for the second usage session is valid based on the one or more authentication models, the computing platform may generate one or more commands directing the second application server to allow the second user to access the second user account in the second usage session hosted by the second application server. In addition, the computing platform may send, to the second application server, the one or more commands directing the second application server to allow the second user to access the second user account in the second usage session hosted by the second application server, where sending the one or more commands directing the second application server to allow the second user to access the second user account in the second usage session hosted by the second application server causes the second application server to allow the second user to access the second user account in the second usage session hosted by the second application server.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to an artificial intelligence (AI) system that may be trained using data that is collected, and not needed, by other enterprise servers and/or systems, such as servers and/or systems that are operated by and/or otherwise associated with a financial institution. For instance, the AI system may include one or more neural networks and may be trained to identify and/or classify personal, unique behaviors based on the collected and otherwise unused data. As an example, the data that is being collected may relate to and/or indicate user behavior (e.g., when a person logs into an online banking portal, do they use voice commands or punch in keys?) and may be used by the AI system to train AI-based authentication models and user-specific behavior profiles.

Figure 1A:
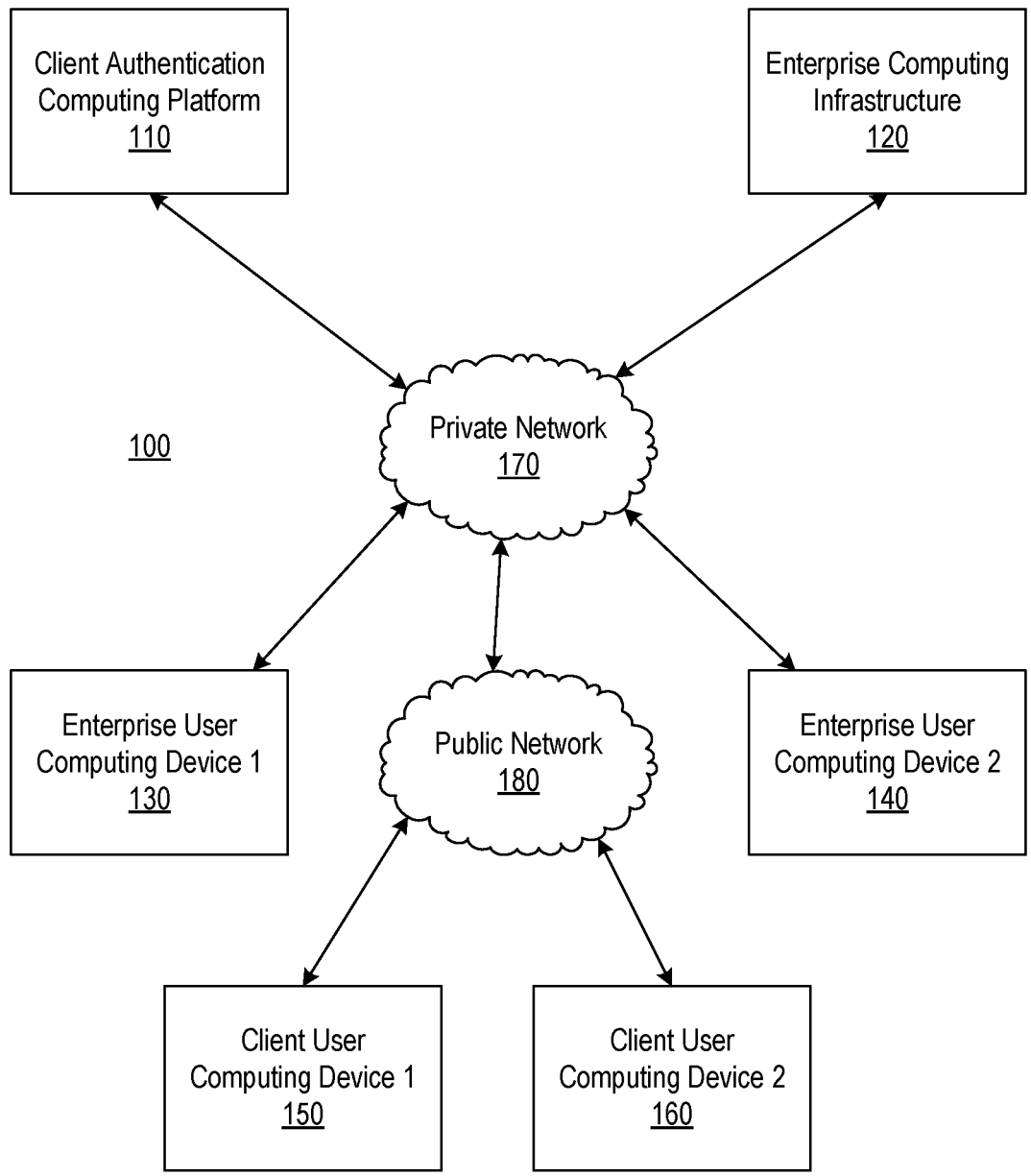
FIGS. 1A and 1B depict an illustrative computing environment for using machine-learning models to authenticate users and protect enterprise-managed information and resources in accordance with one or more example embodiments.
Figure 1B:
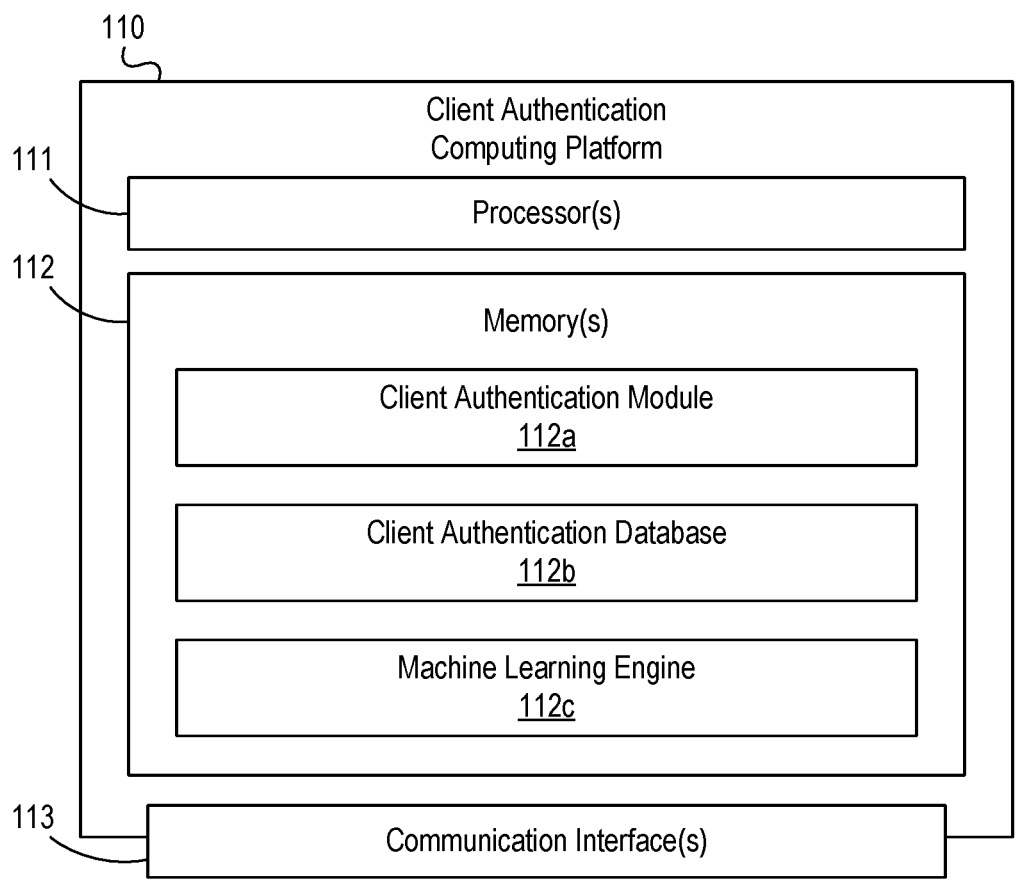

FIGS. 1A and 1B depict an illustrative computing environment for using machine-learning models to authenticate users and protect enterprise-managed information and resources in accordance with one or more example embodiments. Referring to FIG. 1A, computing environment 100 may include one or more computer systems. For example, computing environment 100 may include a client authentication computing platform 110, enterprise computing infrastructure 120, a first enterprise user computing device 130, a second enterprise user computing device 140, a first client user computing device 150, and a second client user computing device 160.

As illustrated in greater detail below, client authentication computing platform 110 may include one or more computing devices configured to perform one or more of the functions described herein. For example, client authentication computing platform 110 may include one or more computers (e.g., laptop computers, desktop computers, servers, server blades, or the like).

Enterprise computing infrastructure 120 may include one or more computing devices and/or other computer components (e.g., processors, memories, communication interfaces). In addition, and as illustrated in greater detail below, enterprise computing infrastructure 120 may be configured to provide various enterprise and/or back-office computing functions for an organization, such as a financial institution. For example, enterprise computing infrastructure 120 may include various servers and/or databases that store and/or otherwise maintain account information, such as financial account information including account balances, transaction history, account owner information, and/or other information. In addition, enterprise computing infrastructure 120 may process and/or otherwise execute transactions on specific accounts based on commands and/or other information received from other computer systems included in computing environment 100. Additionally or alternatively, enterprise computing infrastructure 120 may include various servers and/or databases that host and/or otherwise provide an online banking portal and/or one or more other websites, various servers and/or databases that host and/or otherwise provide a mobile banking portal and/or one or more other mobile applications, one or more interactive voice response (IVR) systems, and/or other systems.

Enterprise user computing device 130 may be a personal computing device (e.g., desktop computer, laptop computer) or mobile computing device (e.g., smartphone, tablet). In addition, enterprise user computing device 130 may be linked to and/or used by a specific enterprise user (who may, e.g., be an employee or other affiliate of an enterprise organization operating client authentication computing platform 110). Enterprise user computing device 140 also may be a personal computing device (e.g., desktop computer, laptop computer) or mobile computing device (e.g., smartphone, tablet). In addition, enterprise user computing device 140 may be linked to and/or used by a specific enterprise user (who may, e.g., be an employee or other affiliate of an enterprise organization operating client authentication computing platform 110) different from the user of enterprise user computing device 130.

Client user computing device 150 may be a personal computing device (e.g., desktop computer, laptop computer) or mobile computing device (e.g., smartphone, tablet). In addition, client user computing device 150 may be linked to and/or used by a specific non-enterprise user (who may, e.g., be a customer of an enterprise organization operating client authentication computing platform 110). Client user computing device 160 also may be a personal computing device (e.g., desktop computer, laptop computer) or mobile computing device (e.g., smartphone, tablet). In addition, client user computing device 160 may be linked to and/or used by a specific non-enterprise user (who may, e.g., be a customer of an enterprise organization operating client authentication computing platform 110) different from the user of client user computing device 150.

Computing environment 100 also may include one or more networks, which may interconnect one or more of client authentication computing platform 110, enterprise computing infrastructure 120, enterprise user computing device 130, enterprise user computing device 140, client user computing device 150, and client user computing device 160. For example, computing environment 100 may include a private network 170 (which may, e.g., interconnect client authentication computing platform 110, enterprise computing infrastructure 120, enterprise user computing device 130, enterprise user computing device 140, and/or one or more other systems which may be associated with an organization, such as a financial institution) and public network 180 (which may, e.g., interconnect client user computing device 150 and client user computing device 160 with private network 170 and/or one or more other systems, public networks, sub-networks, and/or the like).

In one or more arrangements, enterprise user computing device 130, enterprise user computing device 140, client user computing device 150, client user computing device 160, and/or the other systems included in computing environment 100 may be any type of computing device capable of receiving a user interface, receiving input via the user interface, and communicating the received input to one or more other computing devices. For example, enterprise user computing device 130, enterprise user computing device 140, client user computing device 150, client user computing device 160, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of client authentication computing platform 110, enterprise computing infrastructure 120, enterprise user computing device 130, enterprise user computing device 140, client user computing device 150, and client user computing device 160 may, in some instances, be special-purpose computing devices configured to perform specific functions.

Referring to FIG. 1B, client authentication computing platform 110 may include one or more processor(s) 111, memory(s) 112, and communication interface(s) 113. A data bus may interconnect processor 111, memory 112, and communication interface 113. Communication interface 113 may be a network interface configured to support communication between client authentication computing platform 110 and one or more networks (e.g., network 170, network 180, or the like). Memory 112 may include one or more program modules and/or processing engines having instructions that when executed by processor 111 cause client authentication computing platform 110 to perform one or more functions described herein and/or one or more databases that may store and/or otherwise maintain information which may be used by such program modules, processing engines, and/or processor 111. In some instances, the one or more program modules, processing engines, and/or databases may be stored by and/or maintained in different memory units of client authentication computing platform 110 and/or by different computing devices that may form and/or otherwise make up client authentication computing platform 110. For example, memory 112 may have, store, and/or include a client authentication module 112a, a client authentication database 112b, and a machine learning engine 112c.

Client authentication module 112a may have instructions that direct and/or cause client authentication computing platform 110 to use machine-learning models to authenticate users and protect enterprise-managed information and resources, as discussed in greater detail below. Client authentication database 112b may store information used by client authentication module 112a and/or client authentication computing platform 110 in using machine-learning models to authenticate users and protect enterprise-managed information and resources. Machine learning engine 112c may perform and/or provide one or more artificial intelligence and/or machine learning functions and/or services, as illustrated in greater detail below.

Figure 2A:
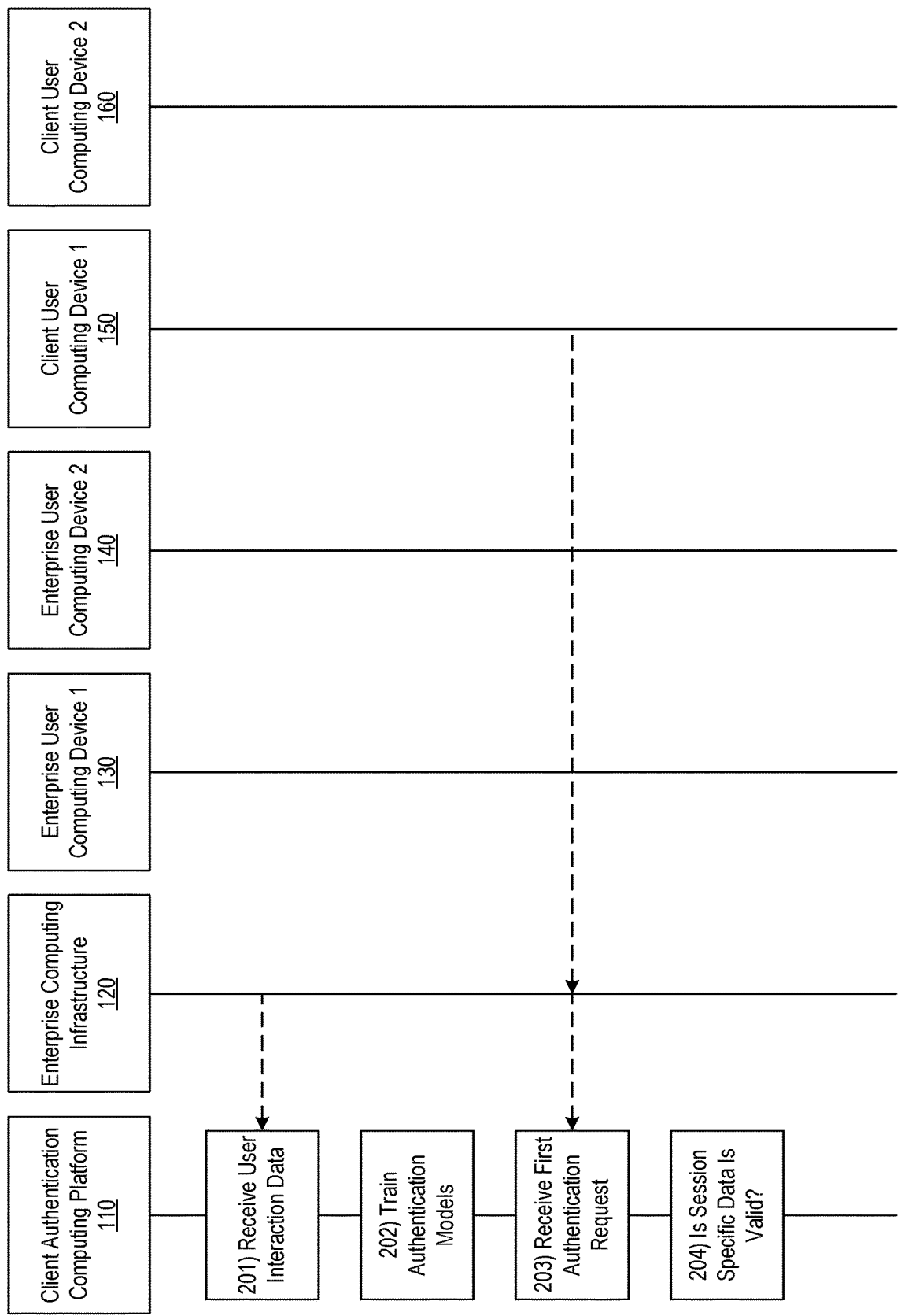
FIGS. 2A-2D depict an illustrative event sequence for using machine-learning models to authenticate users and protect enterprise-managed information and resources in accordance with one or more example embodiments.

FIGS. 2A-2D depict an illustrative event sequence for using machine-learning models to authenticate users and protect enterprise-managed information and resources in accordance with one or more example embodiments. Referring to FIG. 2A, at step 201, client authentication computing platform 110 may receive, via the communication interface (e.g., communication interface 113), from enterprise computing infrastructure (e.g., enterprise computing infrastructure 120), user interaction data.

In some embodiments, receiving the user interaction data from the enterprise computing infrastructure may include receiving unused customer data. For example, in receiving the user interaction data from the enterprise computing infrastructure (e.g., enterprise computing infrastructure 120), client authentication computing platform 110 may receive unused customer data. Such unused customer data may, for instance, include information indicating details of tracked interactions by customer computing devices with various application servers that are included in and/or otherwise associated with enterprise computing infrastructure 120, such as various online banking servers, mobile banking servers, interactive voice response servers, and/or other servers. In addition, the unused customer data may include user-specific information indicating, for a particular user, how often the user accesses one or more specific enterprise systems, how the user interacts with the one or more specific enterprise systems, how the user authenticates with the one or more specific enterprise systems, how much time the user takes to make one or more selections, one or more items actioned by the user and/or one or more items not actioned by the user, and/or how the user responds to options presented by predictive analytics.

At step 202, client authentication computing platform 110 may train, using a machine learning engine (e.g., machine learning engine 112c), one or more authentication models based on the user interaction data. In some embodiments, training the one or more authentication models based on the user interaction data may include training at least one population level model based on the user interaction data. For example, in training the one or more authentication models based on the user interaction data at step 202, client authentication computing platform 110 may train at least one population level model based on the user interaction data. Such a population level model may, for instance, be a non-user-specific model that is applicable to a group of users and/or an entire user base (e.g., all customers of an enterprise organization operating client authentication computing platform 110).

In some embodiments, training the one or more authentication models based on the user interaction data may include training at least one user-specific model for the first user. For example, in training the one or more authentication models based on the user interaction data at step 202, client authentication computing platform 110 may train at least one user-specific model for the first user (who may, e.g., be the user associated with the authentication request received at step 203, as discussed in greater detail below).

In some embodiments, training the at least one user-specific model for the first user may include training a first user-specific model comprising one or more of: a first parameter indicative of how often the first user accesses one or more specific enterprise systems; a second parameter indicative of how the first user interacts with the one or more specific enterprise systems; a third parameter indicative of how the first user authenticates with the one or more specific enterprise systems; a fourth parameter indicative of how much time the first user takes to make one or more selections; a fifth parameter indicative of one or more items actioned by the first user and one or more items not actioned by the first user; or a sixth parameter indicative of how the first user responds to options presented by predictive analytics. For example, in training the at least one user-specific model for the first user, client authentication computing platform 110 may train a first user-specific model that includes a first parameter indicative of how often the first user accesses one or more specific enterprise systems associated with enterprise computing infrastructure 120 (e.g., daily, weekly, monthly, or the like), a second parameter indicative of how the first user interacts with the one or more specific enterprise systems (e.g., using a mobile device, using a desktop computer, or the like), a third parameter indicative of how the first user authenticates with the one or more specific enterprise systems (e.g., using a username and password, using a biometric credential, or the like), a fourth parameter indicative of how much time the first user takes to make one or more selections (e.g., how long does the user take to make certain decisions), a fifth parameter indicative of one or more items actioned by the first user and one or more items not actioned by the first user (e.g., what specific options is the user selecting), and/or a sixth parameter indicative of how the first user responds to options presented by predictive analytics (e.g., does the user select predicted options or manually navigate to other options). As illustrated in greater detail below, any and/or all of these parameters may be used as authentication factors in authenticating the user during future usage sessions.

In some embodiments, training the at least one user-specific model for the first user may include training a second user-specific model based on interaction data associated with at least two different user interaction channels. For example, in training the at least one user-specific model for the first user, client authentication computing platform 110 may train a second user-specific model based on interaction data associated with at least two different user interaction channels. For instance, the user may be tracked across multiple interaction channels, such as an online banking channel, a mobile banking channel, an IVR channel, and/or one or more other channels, and interaction data captured across various channels may be used by client authentication computing platform 110 in training the model.

In some embodiments, training the at least one user-specific model for the first user may include training a third user-specific model based on non-interaction data. For example, in training the at least one user-specific model for the first user, client authentication computing platform 110 may train a third user-specific model based on non-interaction data. Such non-interaction data may, for instance, include user context data such as location patterns associated with the first user's interactions (e.g., global positioning system (GPS) data, network location data, or the like) and/or temporal patterns associated with the first user's interactions (e.g., dates and/or times of previous accesses and/or usage sessions).

At step 203, client authentication computing platform 110 may receive, from a first application server associated with the enterprise computing infrastructure (e.g., enterprise computing infrastructure 120), a request to authenticate a first user to a first user account in a first usage session hosted by the first application server. For instance, client authentication computing platform 110 may receive the request as an application programming interface (API) call from an online banking server, mobile banking server, or IVR server that is included in and/or otherwise associated with enterprise computing infrastructure 120. For example, at step 203, client authentication computing platform 110 may receive a request to authenticate a user of client user computing device 150 (e.g., the first user) to a specific online banking user account (e.g., the first user account).

At step 204, in response to receiving the request to authenticate the first user to the first user account, client authentication computing platform 110 may identify whether session-specific interaction data for the first usage session is valid based on the one or more authentication models. In some embodiments, identifying whether the session-specific interaction data for the first usage session is valid based on the one or more authentication models may include identifying whether the session-specific interaction data for the first usage session is valid based on the at least one user-specific model for the first user. For example, in identifying whether the session-specific interaction data for the first usage session is valid based on the one or more authentication models at step 204, client authentication computing platform 110 may identify whether the session-specific interaction data for the first usage session is valid based on the at least one user-specific model for the first user (which may, e.g., have been trained by client authentication computing platform 110 at step 202). For instance, client authentication computing platform 110 may use any and/or all of the parameters and/or other features of the user-specific model to authenticate the user (e.g., the user of client user computing device 150). In some instances, in using these parameters and/or other features of the user-specific model to authenticate the user (e.g., the user of client user computing device 150), client authentication computing platform 110 may calculate one or more distance values between the expected/target values in the authentication model(s) and the actual/measured values in the session-specific interaction data. For instance, client authentication computing platform 110 may calculate such distance values with respect to the first parameter indicative of how often the first user accesses one or more specific enterprise systems, the second parameter indicative of how the first user interacts with the one or more specific enterprise systems, the third parameter indicative of how the first user authenticates with the one or more specific enterprise systems, the fourth parameter indicative of how much time the first user takes to make one or more selections, the fifth parameter indicative of one or more items actioned by the first user and one or more items not actioned by the first user, and/or the sixth parameter indicative of how the first user responds to options presented by predictive analytics. Subsequently, client authentication computing platform 110 may compare the one or more distance values to one or more static and/or dynamic threshold values to determine whether the session-specific interaction data falls within a permitted range (e.g., indicating that the user's actual behavior is consistent with the model(s) and thus the authentication request is valid) or beyond the permitted range (e.g., indicating that the user's actual behavior is not consistent with the model(s) and thus the authentication request is invalid).

Figure 2B:
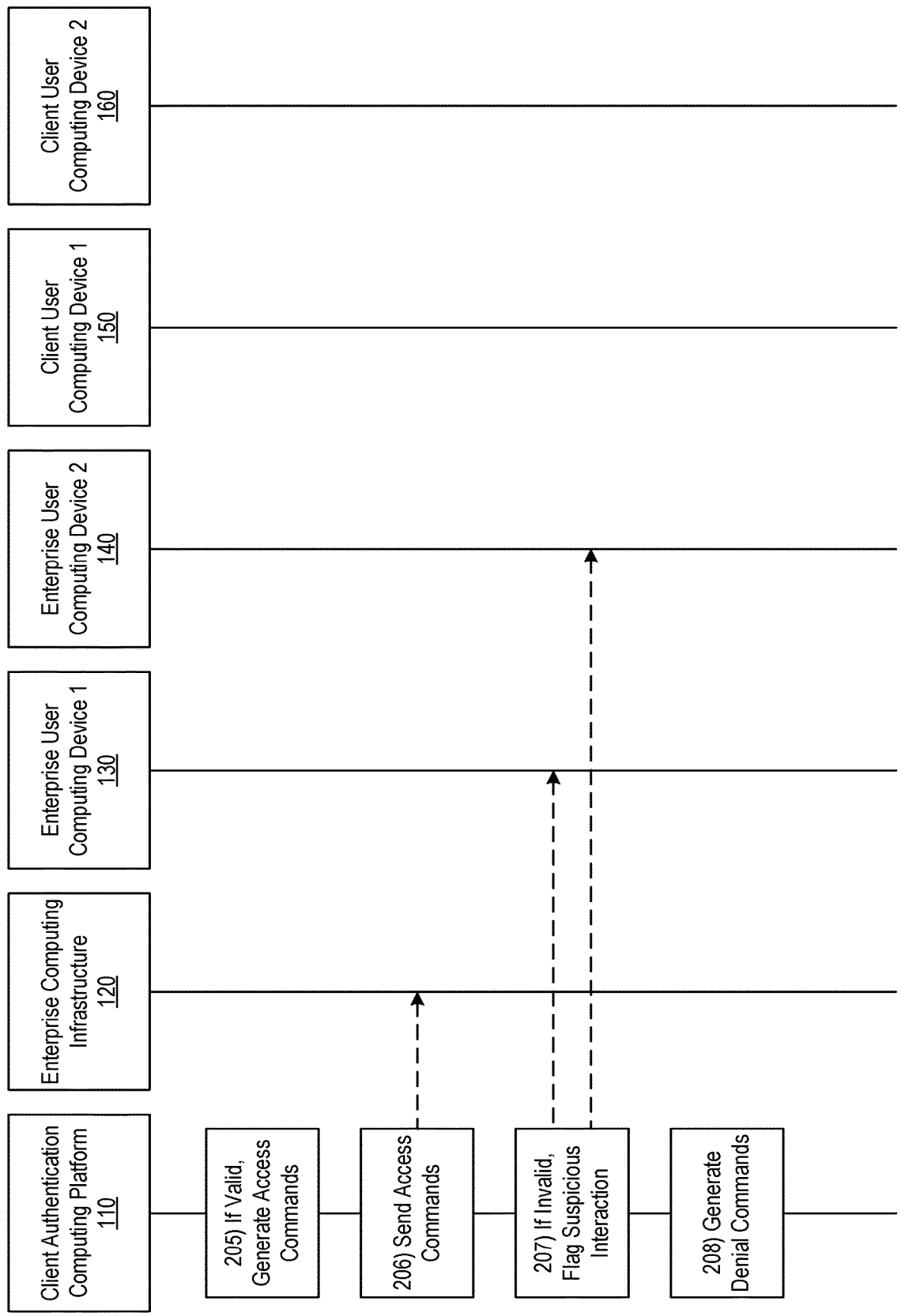
Figure 2C:
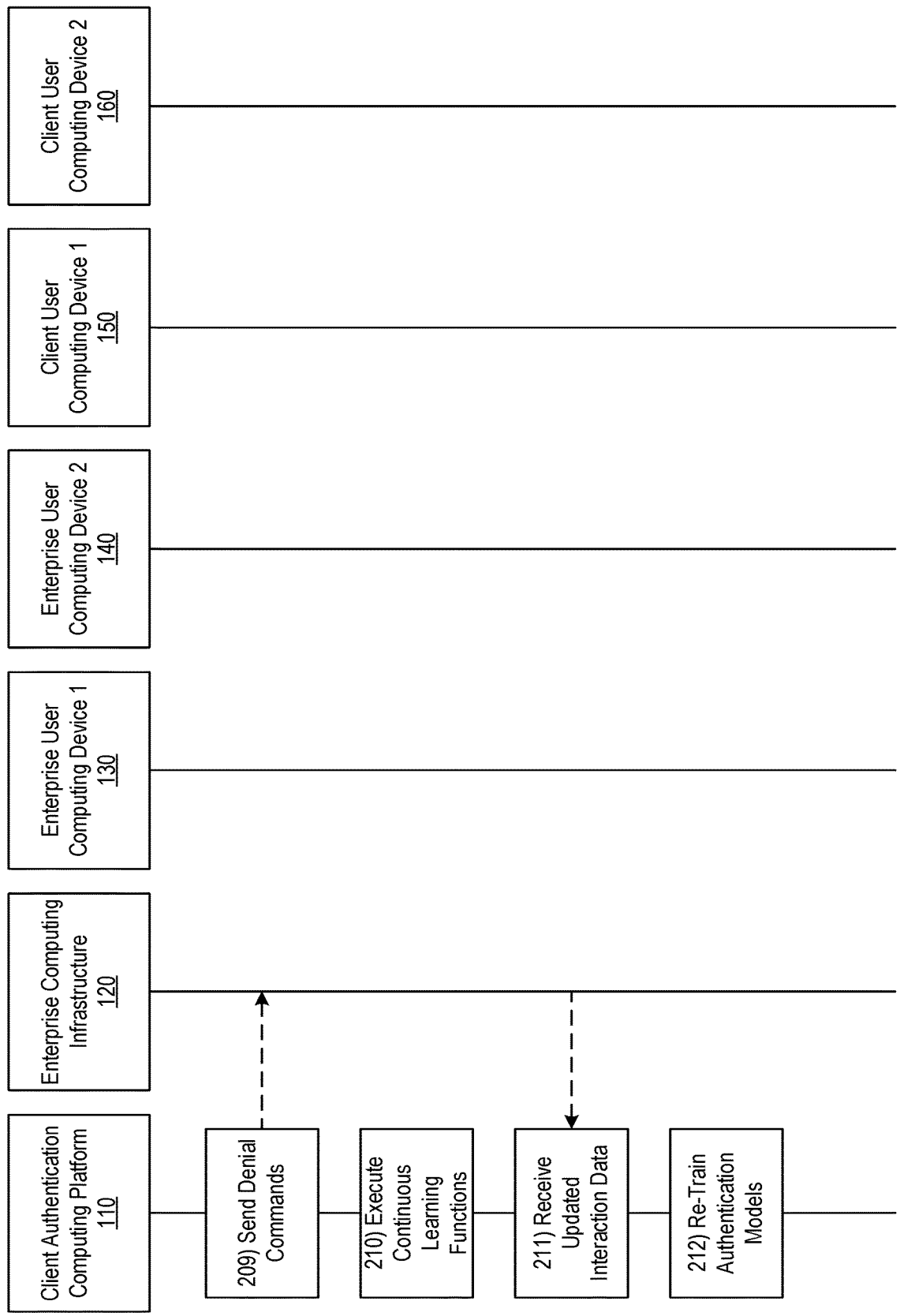

Referring to FIG. 2B, at step 205, based on identifying that the session-specific interaction data for the first usage session is valid based on the one or more authentication models, client authentication computing platform 110 may generate one or more commands directing the first application server to allow the first user to access the first user account in the first usage session hosted by the first application server. At step 206, client authentication computing platform 110 may send, to the first application server (which may, e.g., be included in and/or otherwise associated with enterprise computing infrastructure 120), the one or more commands directing the first application server to allow the first user to access the first user account in the first usage session hosted by the first application server. In addition, by sending the one or more commands directing the first application server to allow the first user to access the first user account in the first usage session hosted by the first application server, client authentication computing platform 110 may cause the first application server to allow the first user to access the first user account in the first usage session hosted by the first application server.

Figure 3:
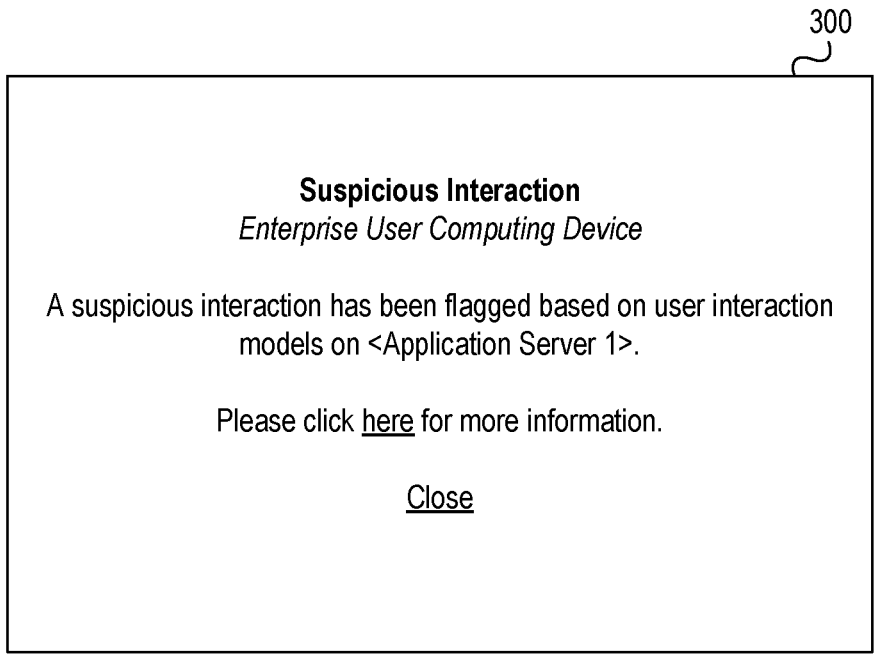
FIGS. 3 and 4 depict example graphical user interfaces for using machine-learning models to authenticate users and protect enterprise-managed information and resources in accordance with one or more example embodiments.

Alternatively, at step 207, based on identifying that the session-specific interaction data for the first usage session is not valid based on the one or more authentication models, client authentication computing platform 110 may flag the first usage session as a suspicious interaction. In some instances, in flagging the first usage session as a suspicious interaction, client authentication computing platform 110 may generate and/or send one or more error messages and/or other information to one or more enterprise user computing devices (e.g., enterprise user computing device 130, enterprise user computing device 140), which may cause the one or more enterprise user computing devices (e.g., enterprise user computing device 130, enterprise user computing device 140) to generate and/or display one or more user interfaces. For example, in flagging the first usage session as a suspicious interaction, client authentication computing platform 110 may cause enterprise user computing device 130 to generate and display a graphical user interface similar to graphical user interface 300, which is illustrated in FIG. 3. As seen in FIG. 3, graphical user interface 300 may include text and/or information indicating that a usage session has been flagged (e.g., "A suspicious interaction has been flagged based on user interaction models on <Application Server 1>. Please click here for more information.").

Figure 4:
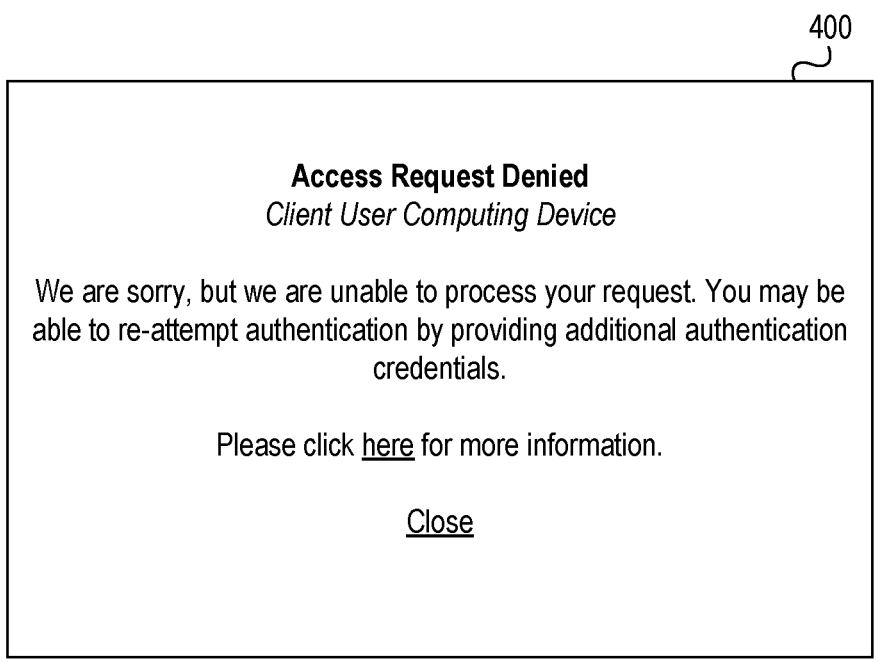

Additionally or alternatively, at step 208, client authentication computing platform 110 may generate one or more commands directing the first application server to deny access to the first user account in the first usage session hosted by the first application server. And, referring to FIG. 2C, at step 209, client authentication computing platform 110 may send, to the first application server (which may, e.g., be included in and/or otherwise associated with enterprise computing infrastructure 120), the one or more commands directing the first application server to deny access to the first user account in the first usage session hosted by the first application server. In addition, by sending the one or more commands directing the first application server to deny access to the first user account in the first usage session hosted by the first application server, client authentication computing platform 110 may cause the first application server to deny access to the first user account in the first usage session hosted by the first application server. In some instances, in sending the one or more commands directing the first application server to deny access to the first user account in the first usage session hosted by the first application server, client authentication computing platform 110 may generate and/or send one or more error messages and/or other information, which may cause one or more client user computing devices (e.g., client user computing device 150, client user computing device 160) to generate and/or display one or more user interfaces. For example, in sending the one or more commands directing the first application server to deny access to the first user account in the first usage session hosted by the first application server, client authentication computing platform 110 may cause client user computing device 150 to generate and display a graphical user interface similar to graphical user interface 400, which is illustrated in FIG. 4. As seen in FIG. 4, graphical user interface 400 may include text and/or information indicating that authentication has failed (e.g., "We are sorry, but we are unable to process your request. You may be able to re-attempt authentication by providing additional authentication credentials. Please click here for more information.").

At step 210, after identifying whether the session-specific interaction data for the first usage session is valid based on the one or more authentication models, client authentication computing platform 110 may execute one or more continuous learning functions to update the one or more authentication models. In executing the one or more continuous learning functions to update the one or more authentication models, client authentication computing platform 110 may, for example, update the one or more authentication models based on interaction data captured in connection with processing the request to authenticate the first user to the first user account.

At step 211, client authentication computing platform 110 may receive, via the communication interface (e.g., communication interface 113), from the enterprise computing infrastructure (e.g., enterprise computing infrastructure 120), updated user interaction data. In some instances, such updated user interaction data may be received by client authentication computing platform 110 from enterprise computing infrastructure 120 on a periodic basis (e.g., weekly, monthly, or the like). In addition, the updated user interaction data received by client authentication computing platform 110 at step 211 may include information similar to the initial user interaction data received by client authentication computing platform 110 at step 201 except that the updated user interaction data received by client authentication computing platform 110 at step 211 may have been capturing during a more recent time period than the initial user interaction data received by client authentication computing platform 110 at step 201.

At step 212, client authentication computing platform 110 may re-train, using the machine learning engine (e.g., machine learning engine 112c), the one or more authentication models based on the updated user interaction data. For example, at step 212, client authentication computing platform 110 may re-train the one or more authentication models based on the updated user interaction data received by client authentication computing platform 110 at step 211 by executing one or more functions similar to those performed at step 202 in initially training the one or more authentication models based on the initial user interaction data received by client authentication computing platform 110 at step 201. In some instances, in re-training the one or more authentication models based on the updated user interaction data received by client authentication computing platform 110 at step 211, client authentication computing platform 110 may disregard interaction data that is beyond a predetermined age (e.g., client authentication computing platform 110 may use a limited time window to narrow the basis for training the model, such that only relatively recent data is treated as being relevant and used in model training).

Figure 2D:
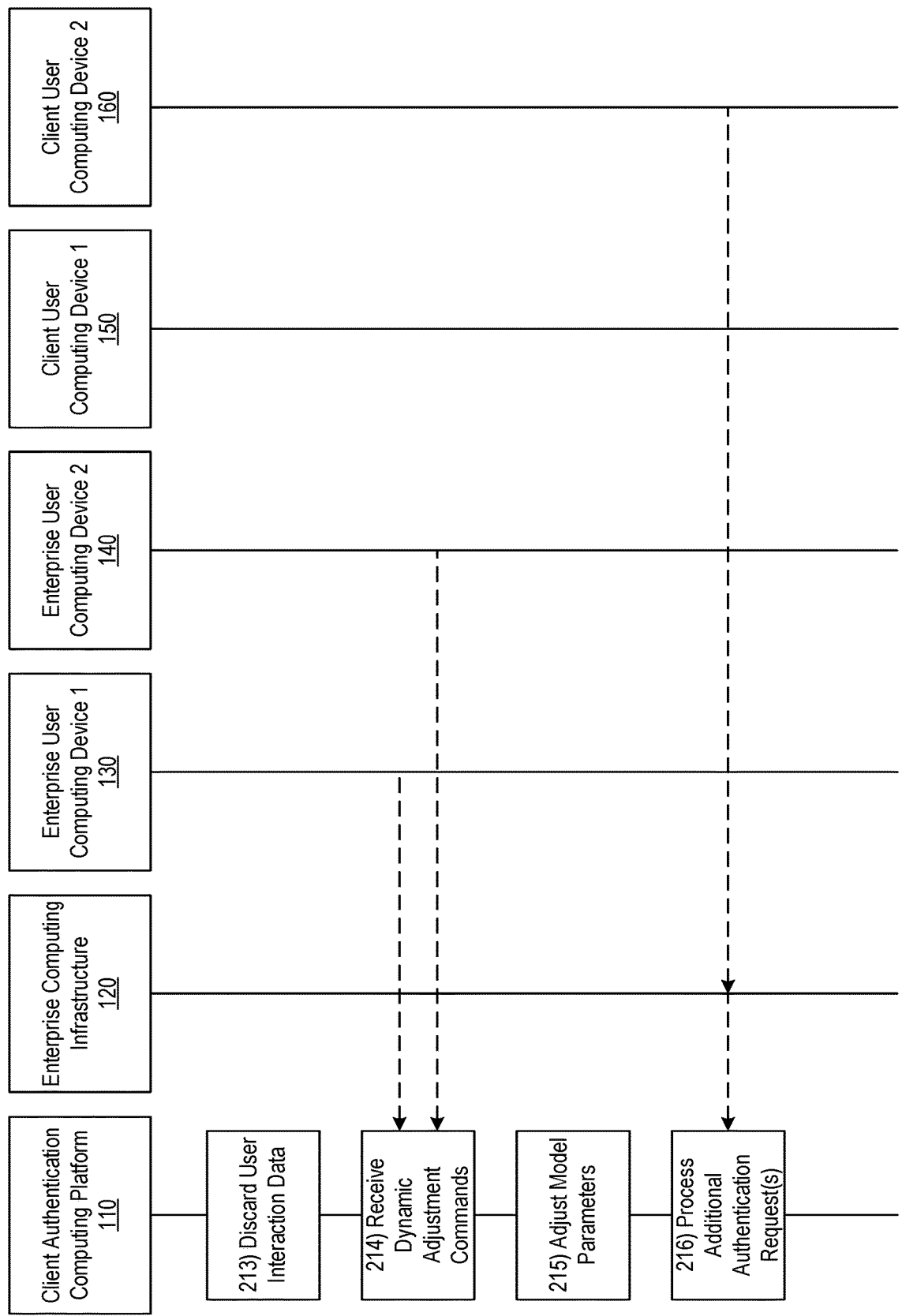

Referring to FIG. 2D, at step 213, after re-training the one or more authentication models based on the updated user interaction data, client authentication computing platform 110 may discard the updated user interaction data. For example, in discarding the updated user interaction data, client authentication computing platform 110 may securely delete and/or otherwise dispose of the updated user interaction data and/or any other interaction data which may be retained and/or otherwise stored on client authentication computing platform 110. This discarding of interaction data may, for instance, provide various technical benefits, including increased privacy, more efficient usage of computer storage resources, and/or more efficient usage of computer processing and/or network resources.

At step 214, after identifying whether the session-specific interaction data for the first usage session is valid based on the one or more authentication models, client authentication computing platform 110 may receive, via the communication interface (e.g., communication interface 113), from an enterprise user computing device (e.g., enterprise user computing device 130, enterprise user computing device 140), one or more dynamic adjustment commands. Such a dynamic adjustment command may, for instance, tune and/or otherwise modify one or more aspects of the one or more authentication models, such as effectiveness rating and/or an accuracy rating of the one or more authentication models. For instance, client authentication computing platform 110 may receive a dynamic adjustment command from enterprise user computing device 130 adjusting an effectiveness rating of the population-level authentication model to capture 95% of suspicious interactions instead of 90% of suspicious interactions (which may, e.g., result in a decreased accuracy rating of the population-level authentication model). In some instances, client authentication computing platform 110 may receive such dynamic adjustment commands (e.g., from enterprise user computing device 130, enterprise user computing device 140) as a result of or in connection with a marketplace disruption, such as a natural disaster, or another external event. For instance, these dynamic adjustment commands may operate to control client authentication computing platform 110 such that certain users connecting to client authentication computing platform 110 and/or enterprise computing infrastructure 120 from certain areas and/or at certain times will be subject to relatively heightened scrutiny for authentication purposes.

At step 215, in response to receiving the one or more dynamic adjustment commands from the enterprise user computing device (e.g., enterprise user computing device 130, enterprise user computing device 140), client authentication computing platform 110 may adjust one or more parameters of the one or more authentication models based on the one or more dynamic adjustment commands received from the enterprise user computing device (e.g., enterprise user computing device 130, enterprise user computing device 140). For instance, and continuing the example above, client authentication computing platform 110 may adjust one or more specific parameters of the population-level authentication model to increase the effectiveness rating of the population-level authentication model to capture 95% of suspicious interactions instead of 90% of suspicious interactions.

At step 216, client authentication computing platform 110 may process one or more additional authentication requests. For example, at step 216, client authentication computing platform 110 may receive, from a second application server associated with the enterprise computing infrastructure (e.g., enterprise computing infrastructure 120), a request to authenticate a second user to a second user account in a second usage session hosted by the second application server. In response to receiving the request to authenticate the second user to the second user account, client authentication computing platform 110 may identify whether session-specific interaction data for the second usage session is valid based on the one or more authentication models. Based on identifying that the session-specific interaction data for the second usage session is valid based on the one or more authentication models, client authentication computing platform 110 may generate one or more commands directing the second application server to allow the second user to access the second user account in the second usage session hosted by the second application server. Subsequently, client authentication computing platform 110 may send, to the second application server (which may, e.g., be included in and/or otherwise associated with enterprise computing infrastructure 120), the one or more commands directing the second application server to allow the second user to access the second user account in the second usage session hosted by the second application server. In addition, by sending the one or more commands directing the second application server to allow the second user to access the second user account in the second usage session hosted by the second application server, client authentication computing platform 110 may cause the second application server to allow the second user to access the second user account in the second usage session hosted by the second application server.

Figure 5:
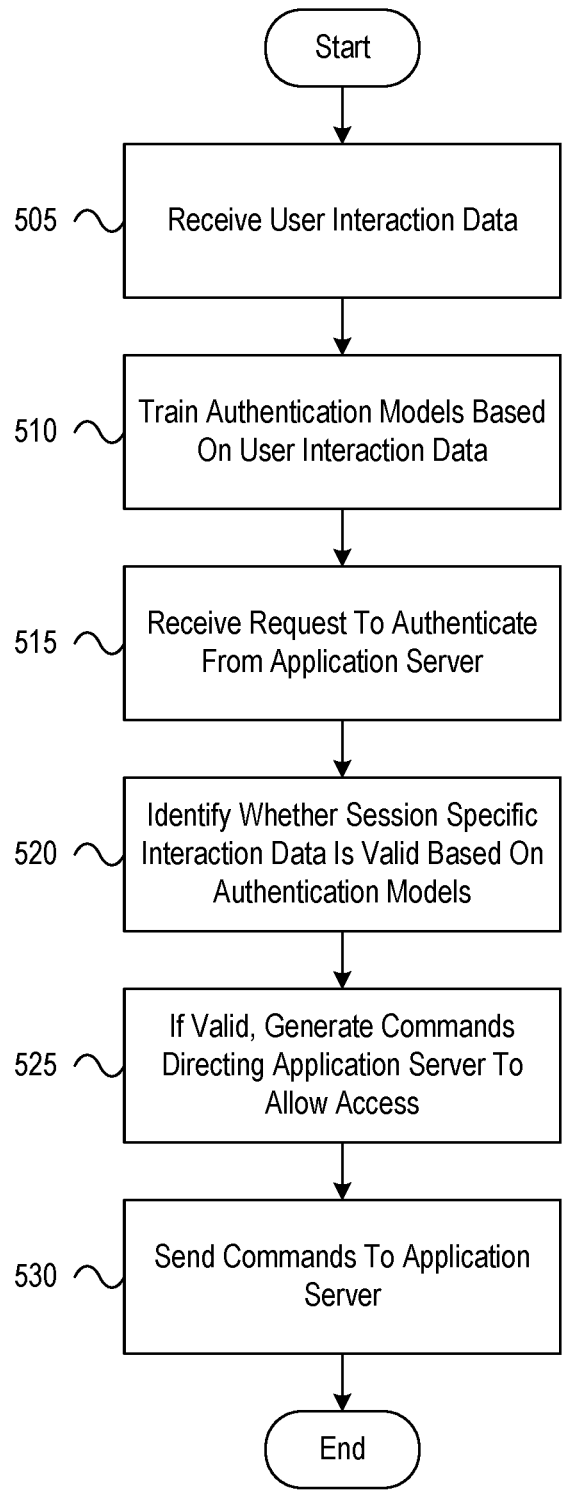
FIG. 5 depicts an illustrative method for using machine-learning models to authenticate users and protect enterprise-managed information and resources in accordance with one or more example embodiments.

FIG. 5 depicts an illustrative method for using machine-learning models to authenticate users and protect enterprise-managed information and resources in accordance with one or more example embodiments. Referring to FIG. 5, at step 505, a computing platform having at least one processor, a communication interface, and memory may receive, via the communication interface, from enterprise computing infrastructure, user interaction data. At step 510, the computing platform may train, using a machine learning engine, one or more authentication models based on the user interaction data. At step 515, the computing platform may receive, from a first application server associated with the enterprise computing infrastructure, a request to authenticate a first user to a first user account in a first usage session hosted by the first application server. At step 520, in response to receiving the request to authenticate the first user to the first user account, the computing platform may identify whether session-specific interaction data for the first usage session is valid based on the one or more authentication models. At step 525, based on identifying that the session-specific interaction data for the first usage session is valid based on the one or more authentication models, the computing platform may generate one or more commands directing the first application server to allow the first user to access the first user account in the first usage session hosted by the first application server. At step 530, the computing platform may send, to the first application server, the one or more commands directing the first application server to allow the first user to access the first user account in the first usage session hosted by the first application server, where sending the one or more commands directing the first application server to allow the first user to access the first user account in the first usage session hosted by the first application server causes the first application server to allow the first user to access the first user account in the first usage session hosted by the first application server.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
at least one processor;
a communication interface communicatively coupled to the at least one processor; and
memory storing computer-readable instructions that, when executed by the at least one processor, cause the computing platform to:
receive, via the communication interface, from enterprise computing infrastructure, user interaction data;
train, using a machine learning engine, one or more authentication models based on the user interaction data, wherein training the one or more authentication models based on the user interaction data comprises training at least one user-specific model for a first user and wherein training the at least one user-specific model for the first user comprises training a first user-specific model based on interaction data associated with at least two different user interaction channels including at least two of: an online banking channel, a mobile banking channel, and an interactive voice response channel;

receive, from a first application server associated with the enterprise computing infrastructure, a request to authenticate a first user to a first user account in a first usage session hosted by the first application server;

in response to receiving the request to authenticate the first user to the first user account, identify whether session-specific interaction data for the first usage session is valid based on the one or more authentication models, identifying whether session-specific interaction data for the first usage session is valid based on the one or more authentication models including:

identifying one or more parameters of the one or more authentication model;

calculating one or more distance values between an expected value of a parameter in the one or more authentication models and a measured value of the parameter in the session-specific interaction data; and comparing the calculated one or more distance values to one or more threshold values to determine whether the calculated one or more distance values are within a permitted range indicating that the session-specific interaction data is valid; and based on identifying that the session-specific interaction data for the first usage session is valid based on the one or more authentication models:

generate one or more commands directing the first application server to allow the first user to access the first user account in the first usage session hosted by the first application server;

send, to the first application server, the one or more commands directing the first application server to allow the first user to access the first user account in the first usage session hosted by the first application server, wherein sending the one or more commands directing the first application server to allow the first user to access the first user account in the first usage session hosted by the first application server causes the first application server to allow the first user to access the first user account in the first usage session hosted by the first application server;

after identifying whether the session-specific interaction data for the first usage session is valid based on the one or more authentication models:

detect a disruption in a marketplace;

receive, responsive to the detected disruption in the marketplace and via the communication interface, from an enterprise user computing device, one or more dynamic adjustment commands to adjust at least one of: an effectiveness rating of the one or more authentication models or an accuracy rating of the one or more authentication models; and in response to receiving the one or more dynamic adjustment commands from the enterprise user computing device, adjust the at least one of: the effectiveness rating of the one or more authentication models or the accuracy rating of the one or more authentication models based on the one or more dynamic adjustment commands received from the enterprise user computing device;

receive, via the communication interface, from the enterprise computing infrastructure, updated user interaction data; and re-train, using the machine learning engine, the one or more authentication models based on the updated user interaction data, wherein the updated user interaction data is captured from a limited time window and disregards user interaction data beyond a predetermined age.

2. The computing platform of claim 1, wherein receiving the user interaction data from the enterprise computing infrastructure comprises receiving unused customer data.

3. The computing platform of claim 1, wherein training the one or more authentication models based on the user interaction data comprises training at least one population level model based on the user interaction data.

4. The computing platform of claim 1, wherein training the at least one user-specific model for the first user comprises training a second user-specific model comprising one or more of:

a first parameter indicative of how often the first user accesses one or more specific enterprise systems;

a second parameter indicative of how the first user interacts with the one or more specific enterprise systems;

a third parameter indicative of how the first user authenticates with the one or more specific enterprise systems;

a fourth parameter indicative of how much time the first user takes to make one or more selections;

a fifth parameter indicative of one or more items actioned by the first user and one or more items not actioned by the first user; or a sixth parameter indicative of how the first user responds to options presented by predictive analytics.

5. The computing platform of claim 4, wherein calculating one or more distance values between an expected value of a parameter in the one or more authentication models and a measured value of the parameter in the session-specific interaction data includes calculating a distance value between an expected value of the first parameter indicative of how often the first user accesses one or more specific enterprise systems in the one or more authentication models and a measured value of the first parameter indicative of how often the first user accesses one or more specific enterprise systems in the session-specific interaction data.

6. The computing platform of claim 1, wherein training the at least one user-specific model for the first user comprises training a third user-specific model based on non-interaction data.

7. The computing platform of claim 1, wherein identifying whether the session-specific interaction data for the first usage session is valid based on the one or more authentication models comprises identifying whether the session-specific interaction data for the first usage session is valid based on the at least one user-specific model for the first user.

8. The computing platform of claim 1, wherein the memory stores additional computer-readable instructions that, when executed by the at least one processor, cause the computing platform to:

based on identifying that the session-specific interaction data for the first usage session is not valid based on the one or more authentication models:

flag the first usage session as a suspicious interaction;

generate one or more commands directing the first application server to deny access to the first user account in the first usage session hosted by the first application server; and send, to the first application server, the one or more commands directing the first application server to deny access to the first user account in the first usage session hosted by the first application server, wherein sending the one or more commands directing the first application server to deny access to the first user account in the first usage session hosted by the first application server causes the first application server to deny access to the first user account in the first usage session hosted by the first application server.

9. The computing platform of claim 1, wherein the memory stores additional computer-readable instructions that, when executed by the at least one processor, cause the computing platform to:

after identifying whether the session-specific interaction data for the first usage session is valid based on the one or more authentication models, execute one or more continuous learning functions to update the one or more authentication models.

10. The computing platform of claim 1, wherein the memory stores additional computer-readable instructions that, when executed by the at least one processor, cause the computing platform to:

after re-training the one or more authentication models based on the updated user interaction data, discard the updated user interaction data.

11. The computing platform of claim 1, wherein the memory stores additional computer-readable instructions that, when executed by the at least one processor, cause the computing platform to:

receive, from a second application server associated with the enterprise computing infrastructure, a request to authenticate a second user to a second user account in a second usage session hosted by the second application server;

in response to receiving the request to authenticate the second user to the second user account, identify whether session-specific interaction data for the second usage session is valid based on the one or more authentication models; and based on identifying that the session-specific interaction data for the second usage session is valid based on the one or more authentication models:
generate one or more commands directing the second application server to allow the second user to access the second user account in the second usage session hosted by the second application server; and send, to the second application server, the one or more commands directing the second application server to allow the second user to access the second user account in the second usage session hosted by the second application server, wherein sending the one or more commands directing the second application server to allow the second user to access the second user account in the second usage session hosted by the second application server causes the second application server to allow the second user to access the second user account in the second usage session hosted by the second application server.

12. A method, comprising:

at a computing platform comprising at least one processor, a communication interface, and memory:

receiving, by the at least one processor, via the communication interface, from enterprise computing infrastructure, user interaction data;

training, by the at least one processor, using a machine learning engine, one or more authentication models based on the user interaction data, wherein training the one or more authentication models based on the user interaction data comprises training at least one user-specific model for a first user and wherein training the at least one user-specific model for the first user comprises training a first user-specific model based on interaction data associated with at least two different user interaction channels including at least two of: an online banking channel, a mobile banking channel, and an interactive voice response channel;

receiving, by the at least one processor, from a first application server associated with the enterprise computing infrastructure, a request to authenticate a first user to a first user account in a first usage session hosted by the first application server;

in response to receiving the request to authenticate the first user to the first user account, identifying, by the at least one processor, whether session-specific interaction data for the first usage session is valid based on the one or more authentication models, identifying whether session-specific interaction data for the first usage session is valid based on the one or more authentication models including:

identifying one or more parameters of the one or more authentication model;

calculating one or more distance values between an expected value of a parameter in the one or more authentication models and a measured value of the parameter in the session-specific interaction data; and comparing the calculated one or more distance values to one or more threshold values to determine whether the calculated one or more distance values are within a permitted range indicating that the session-specific interaction data is valid; and based on identifying that the session-specific interaction data for the first usage session is valid based on the one or more authentication models:

generating, by the at least one processor, one or more commands directing the first application server to allow the first user to access the first user account in the first usage session hosted by the first application server;

sending, by the at least one processor, to the first application server, the one or more commands directing the first application server to allow the first user to access the first user account in the first usage session hosted by the first application server, wherein sending the one or more commands directing the first application server to allow the first user to access the first user account in the first usage session hosted by the first application server causes the first application server to allow the first user to access the first user account in the first usage session hosted by the first application server;

after identifying whether the session-specific interaction data for the first usage session is valid based on the one or more authentication models:

detecting, by the at least one processor, a disruption in a marketplace;

receiving, by the at least one processor and responsive to the detected disruption in the marketplace and via the communication interface, from an enterprise user computing device, one or more dynamic adjustment commands to adjust at least one of: an effectiveness rating of the one or more authentication models or an accuracy rating of the one or more authentication models; and in response to receiving the one or more dynamic adjustment commands from the enterprise user computing device, adjusting, by the at least one processor, the at least one of: the effectiveness rating of the one or more authentication models or the accuracy rating of the one or more authentication models based on the one or more dynamic adjustment commands received from the enterprise user computing device;

receiving, by the at least one processor via the communication interface, from the enterprise computing infrastructure, updated user interaction data; and re-training, by the at least one processor and using the machine learning engine, the one or more authentication models based on the updated user interaction data, wherein the updated user interaction data is captured from a limited time window and disregards user interaction data beyond a predetermined age.

13. The method of claim 12, wherein receiving the user interaction data from the enterprise computing infrastructure comprises receiving unused customer data.

14. The method of claim 12, wherein training the one or more authentication models based on the user interaction data comprises training at least one population level model based on the user interaction data.

15. The method of claim 12, wherein training the at least one user-specific model for the first user comprises training a second user-specific model comprising one or more of:
a first parameter indicative of how often the first user accesses one or more specific enterprise systems;
a second parameter indicative of how the first user interacts with the one or more specific enterprise systems;
a third parameter indicative of how the first user authenticates with the one or more specific enterprise systems;
a fourth parameter indicative of how much time the first user takes to make one or more selections;
a fifth parameter indicative of one or more items actioned by the first user and one or more items not actioned by the first user; or
a sixth parameter indicative of how the first user responds to options presented by predictive analytics.

16. One or more non-transitory computer-readable media storing instructions that, when executed by a computing platform comprising at least one processor, a communication interface, and memory, cause the computing platform to:
receive, via the communication interface, from enterprise computing infrastructure, user interaction data;
train, using a machine learning engine, one or more authentication models based on the user interaction data, wherein training the one or more authentication models based on the user interaction data comprises training at least one user-specific model for a first user and wherein training the at least one user-specific model for the first user comprises training a first user-specific model based on interaction data associated with at least two different user interaction channels including at least two of: an online banking channel, a mobile banking channel, and an interactive voice response channel;

receive, from a first application server associated with the enterprise computing infrastructure, a request to authenticate a first user to a first user account in a first usage session hosted by the first application server;

in response to receiving the request to authenticate the first user to the first user account, identify whether session-specific interaction data for the first usage session is valid based on the one or more authentication models, identifying whether session-specific interaction data for the first usage session is valid based on the one or more authentication models including:
identifying one or more parameters of the one or more authentication model;
calculating one or more distance values between an expected value of a parameter in the one or more authentication models and a measured value of the parameter in the session-specific interaction data; and
comparing the calculated one or more distance values to one or more threshold values to determine whether the calculated one or more distance values are within a permitted range indicating that the session-specific interaction data is valid; and based on identifying that the session-specific interaction data for the first usage session is valid based on the one or more authentication models:
generate one or more commands directing the first application server to allow the first user to access the first user account in the first usage session hosted by the first application server;
send, to the first application server, the one or more commands directing the first application server to allow the first user to access the first user account in the first usage session hosted by the first application server, wherein sending the one or more commands directing the first application server to allow the first user to access the first user account in the first usage session hosted by the first application server causes the first application server to allow the first user to access the first user account in the first usage session hosted by the first application server;

after identifying whether the session-specific interaction data for the first usage session is valid based on the one or more authentication models:
detect a disruption in a marketplace;
receive, responsive to the detected disruption in the marketplace and via the communication interface, from an enterprise user computing device, one or more dynamic adjustment commands to adjust at least one of: an effectiveness rating of the one or more authentication models or an accuracy rating of the one or more authentication models; and
in response to receiving the one or more dynamic adjustment commands from the enterprise user computing device, adjust the at least one of: the effectiveness rating of the one or more authentication models or the accuracy rating of the one or more authentication models based on the one or more dynamic adjustment commands received from the enterprise user computing device;
receive, via the communication interface, from the enterprise computing infrastructure, updated user interaction data; and re-train, using the machine learning engine, the one or more authentication models based on the updated user interaction data, wherein the updated user interaction data is captured from a limited time window and disregards user interaction data beyond a predetermined age.

* * * * *